United States Patent
Bin

(10) Patent No.: US 10,212,918 B2
(45) Date of Patent: Feb. 26, 2019

(54) PET URINE PAD CONVENIENT TO TAKE AS WELL AS PRODUCTION METHOD AND PROCESSING EQUIPMENT THEREOF

(71) Applicant: Jiangsu Zhongheng Pet Articles Joint-Stock Co., Ltd., Jiangsu (CN)

(72) Inventor: Qiu Bin, Jiangsu (CN)

(73) Assignee: Jiangsu Zhongheng Pet Articles Joint-Stock Co., Ltd., Jiangsu (CN)

( * ) Notice: Subject to any disclaimer, the term of this patent is extended or adjusted under 35 U.S.C. 154(b) by 344 days.

(21) Appl. No.: 14/924,608

(22) Filed: Oct. 27, 2015

(65) Prior Publication Data

US 2016/0113236 A1 Apr. 28, 2016

(30) Foreign Application Priority Data

Oct. 27, 2014 (CN) .......................... 2014 1 0577898

(51) Int. Cl.
*A01K 1/015* (2006.01)
*A01K 1/01* (2006.01)

(52) U.S. Cl.
CPC .......... *A01K 1/0157* (2013.01); *A01K 1/0107* (2013.01)

(58) Field of Classification Search
CPC .... A01K 1/0157; A01K 1/0104; A01K 1/011; B32B 38/0004; B32B 38/04; B32B 2038/045
USPC ......................................... 156/443, 459, 474
See application file for complete search history.

(56) References Cited

U.S. PATENT DOCUMENTS

| | | | | |
|---|---|---|---|---|
| 3,578,155 | A | * | 5/1971 | Small ................ A61F 13/15634 156/202 |
| 5,387,173 | A | * | 2/1995 | Simmons, Jr. ....... B31D 5/0047 493/407 |
| 2001/0045255 | A1 | * | 11/2001 | Tharpe, Jr. ........ A61F 13/15699 156/157 |

* cited by examiner

*Primary Examiner* — George R Koch
(74) *Attorney, Agent, or Firm* — Osha Liang LLP

(57) ABSTRACT

A pet urine pad convenient to carry includes multiple single urine pads, wherein the middle part of each single urine pad is folded, every two adjacent single urine pads are connected by a breaking-point line and the multiple single urine pads are laminated in sequence from top to bottom to form an integral body.

2 Claims, 4 Drawing Sheets

PET URINE PAD CONVENIENT TO TAKE AS WELL AS PRODUCTION METHOD AND PROCESSING EQUIPMENT THEREOF

CROSS-REFERENCE TO RELATED APPLICATIONS

This application claims the priority of Chinese Patent Application No. CN201410577898.9, filed on Oct. 27, 2014, the disclosure of which is incorporated by reference in its entirety.

TECHNICAL FIELD

The present invention relates to a pet urine pad convenient to carry as well as a production method and processing equipment thereof

BACKGROUND ART

With the development of society and growth in the living standard, people also continually pursue spiritual life while enjoying material life, so more and more people yearn for natural ease, and keeping pets has gradually become a kind of popular fashion. In daily life, pet urine pads are generally used by people to clear excrements of pets. However, existing single pet urine pads are connected by breaking-point lines, directly folded and then put into packaging bags for package and use, and thus are not convenient to use and occupy a relatively large space since the storage function is not ideal in the use process, and therefore the aesthetic property of the household environment is affected. In order to solve such problems, technical staff of pet product manufacturing enterprises makes improvement on existing pet urine pad processing and production equipment.

SUMMARY OF THE PRESENT INVENTION

The technical problem to be solved by the present invention is to provide a pet urine pad convenient to carry.

In order to solve said technical problem, the technical solution adopted by the present invention is as follows: the pet urine pad convenient to carry comprises multiple single urine pads, wherein the middle part of each single urine pad is folded, every two adjacent single urine pads are connected through a breaking-point line, and multiple single urine pads are laminated in sequence from top to bottom to form an integral body.

The technical problem to be solved by the present invention is to provide a production method of the pet urine pad convenient to carry.

In order to solve said technical problem, the technical solution adopted by the present invention is as follows: according to the production method of the pet urine pad convenient to carry, a continuous pet urine pad produced by a pet urine pad processing main machine is conveyed to a buffer device through a conveying device, is drawn by a transverse traction device, is subsequently drawn by a vertical traction device to the vertical direction, is marked with breaking-point lines after entering a point-breaking device and is folded after entering a folding device; and the folded pet urine pads convenient to carry are stacked on a folding device frame.

The technical problem to be solved by the present invention is to provide processing equipment of the pet urine pad convenient to carry.

In order to solve said technical problem, the technical solution adopted by the present invention is as follows: the processing equipment of the pet urine pad convenient to carry comprises a pet urine pad processing main machine frame and a conveying device arranged on the pet urine pad processing main machine frame, wherein a buffer device frame is arranged at the rear end of the pet urine pad processing main machine frame, a buffer device is arranged on the buffer device frame, a folding device frame is arranged at the rear end of the buffer device frame, the transverse traction device is arranged on one side of the front end of the folding device frame, the vertical traction device is arranged in the middle of the upper end of the folding device frame, the point-breaking device is arranged on the folding device frame on the lower end of the vertical traction device, and the folding device is arranged on the folding device frame at the lower end of the point-breaking device; a continuous pet urine pad produced by the pet urine pad processing main machine is conveyed to the buffer device through the conveying device, is drawn by the transverse traction device, is subsequently drawn by the vertical traction device to the vertical direction, is marked with breaking-point lines after entering the point-breaking device and is folded after entering the folding device; and the folded pet urine pads convenient to carry are stacked on the folding device frame.

In order to well solve said technical problem, the further technical solution adopted by the present invention is as follows: the structure of the folding device comprises two folding rollers symmetrically arranged on the folding device frame through rotating shafts, respectively, wherein the two folding rollers are identical in structure and matched with each other, a folding notch is configured in one side of each folding roller, a blade is arranged on the other side of the corresponding folding roller, a rotating arm is rotatably arranged on each folding roller through a revolving shaft and equipped with a limiting pillar, barrier pillars matched with the limiting pillars to each other are arranged on the folding device frame, a folding hook is connected to one end of each rotating arm, a hook part of each folding hook is arranged in the corresponding folding notch, and the other end of the corresponding rotating arm is arranged on the corresponding folding roller through a spring.

The present invention has the advantages that the pet urine pad convenient to carry as well as the production method and processing equipment thereof are high in production efficiency; the produced pet urine pad convenient to carry is convenient and efficient to use, occupies a small space and is convenient to draw, transport and store since the multiple folded single urine pads are sequentially laminated and stored from top to bottom to form an integral body, and thus beautifies the household environment, keeps the household environment clean and tidy and alleviates the labor intensity of people.

Figure 1:
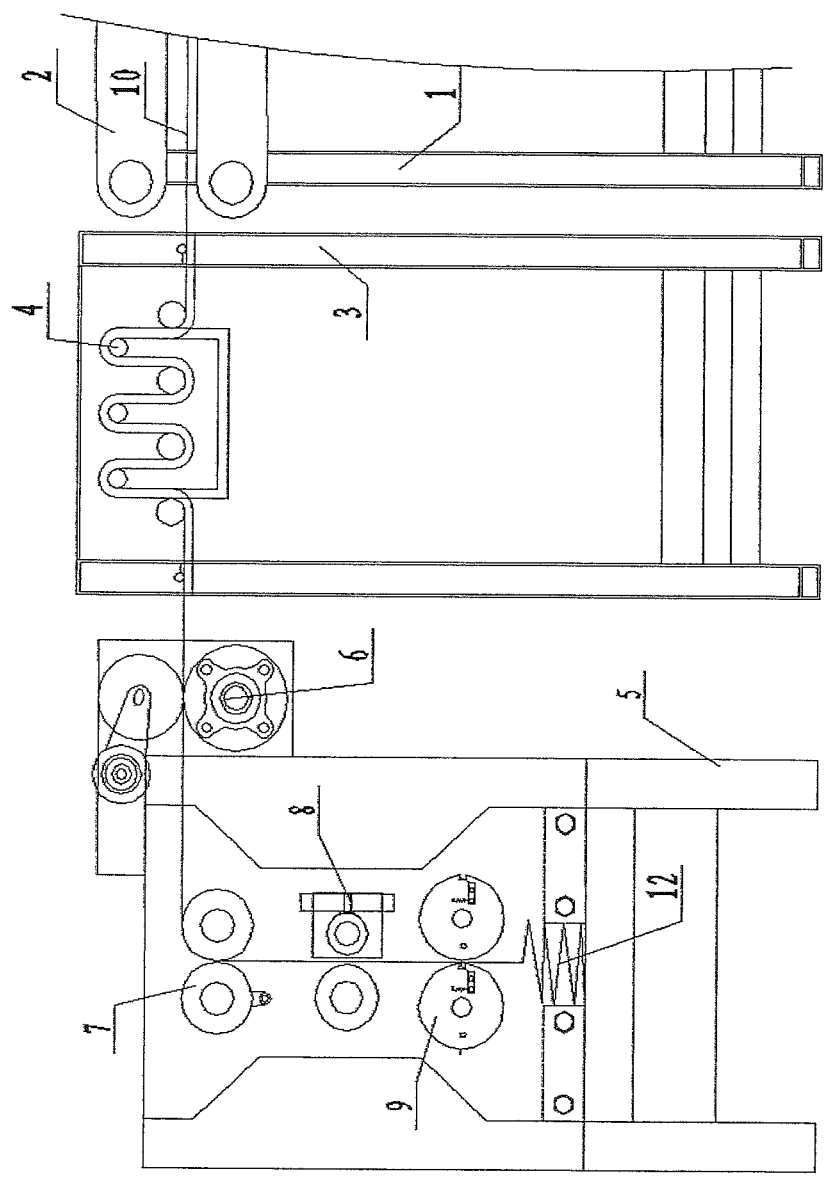
FIG. 1 is a structural schematic diagram of the processing equipment in the pet urine pad convenient to carry as well as the production method and processing equipment thereof according to the present invention.

In Figs.: the pet urine pad processing main machine frame 1, the conveying device 2, the buffer device frame 3, the buffer device 4, the folding device frame 5, the transverse traction device 6, the vertical traction device 7, the point-breaking device 8, the folding device 9, the continuous pet urine pad 10, the breaking-point line 11, the pet urine pad convenient to carry 12, the rotating shaft 13, the folding roller 14, the folding notch 15, the blade 16, the revolving shaft 17, the rotating atm 18, the limiting pillar 19, the barrier pillar 20, the folding hook 21, the spring 22, the single urine pad 23, the urine pad packaging box 24, the upper cover 25 and the pulling opening 26 are described.

DETAILED DESCRIPTION

Figure 3:
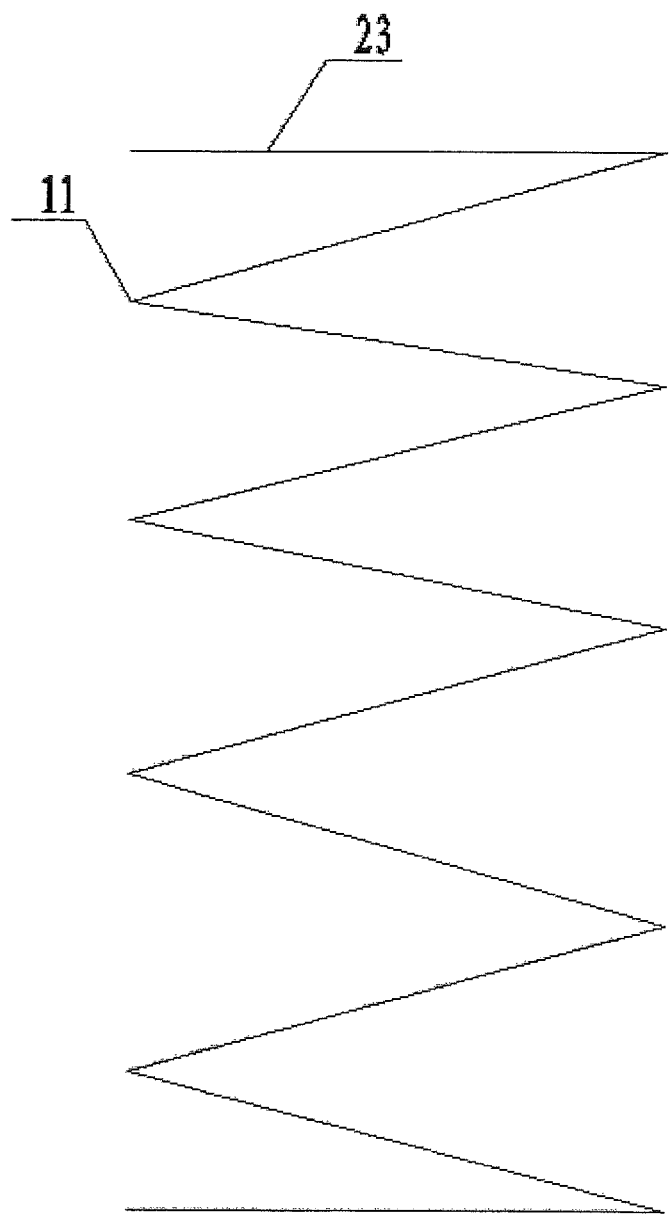
FIG. 3 is a structural schematic diagram of the pet urine pad convenient to carry in the pet urine pad convenient to carry as well as the production method and processing equipment thereof according to the present invention.

The specific content of the present invention is described in detail below in conjunction with the accompanying drawings and specific embodiments As can be seen from FIG. 3, the pet urine pad convenient to carry comprises multiple single urine pads 23, wherein the middle part of each single urine pad 23 is folded, every two adjacent single urine pads 23 are connected through a breaking-point line 11, and the multiple single urine pads 23 are laminated from top to bottom in sequence to form an integral body.

As can be seen from FIG. 1 and FIG. 2, according to a production method of the pet urine pad convenient to carry, the continuous pet urine pad 10 produced by the pet urine pad processing main machine is conveyed to the buffer device 4 through the conveying device 2, is drawn by the transverse traction device 6, is subsequently drawn by the vertical traction device 7 to the vertical direction, is marked with a breaking-point line 11 after entering the point-breaking device 8 and is folded after entering the folding device 9; and the folded pet urine pads 12 convenient to carry are stacked on the folding device frame 5.

Figure 2:
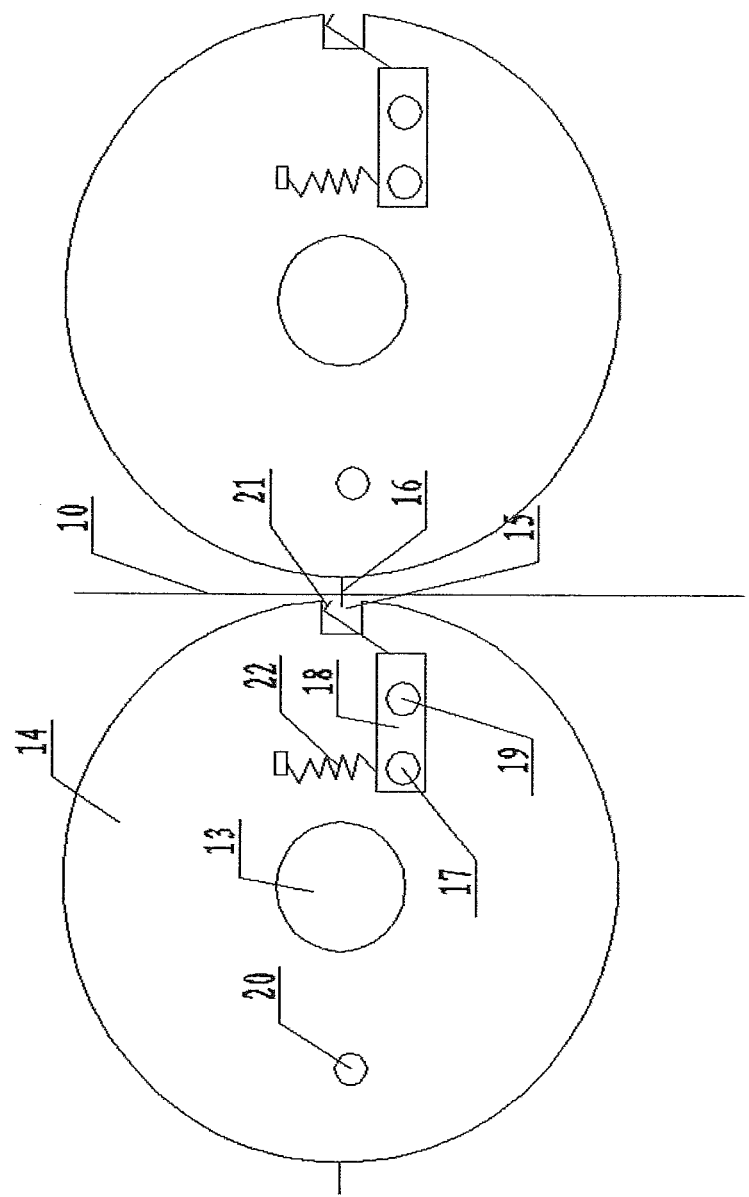
FIG. 2 is a structural schematic diagram of the folding structure in the pet urine pad convenient to carry as well as the production method and processing equipment thereof according to the present invention.

As can be seen from FIG. 1 and FIG. 2, processing equipment of the pet urine pad convenient to carry comprises the pet urine pad processing main machine frame 1 and the conveying device 2 arranged on the pet urine pad processing main machine frame 1, wherein the buffer device frame 3 is arranged at the rear end of the pet urine pad processing main machine frame 1, the buffer device 4 is arranged on the buffer device frame 3, the folding device frame 5 is arranged at the rear end of the buffer device frame 3, the transverse traction device 6 is arranged on one side of the front end of the folding device frame 5, the vertical traction device 7 is arranged in the middle of the upper end of the folding device frame 5, the point-breaking device 8 is arranged on the folding device frame 5 on the lower end of the vertical traction device 7, and the folding device 9 is arranged on the folding device frame 5 at the lower end of the point-breaking device 8; the continuous pet urine pad 10 produced by the pet urine pad processing main machine is conveyed to the buffer device 4 through the conveying device 2, is drawn by the transverse traction device 6, is subsequently drawn by the vertical traction device 7 to the vertical direction, is marked with breaking-point lines 11 after entering the point-breaking device 8 and is folded after entering the folding device 9; and the folded pet urine pads 12 convenient to carry are stacked on the folding device frame 5.

As can be seen from FIG. 2, the structure of the folding device 9 comprises two folding rollers 14 symmetrically arranged on the folding device frame 5 through rotating shafts 13, respectively, wherein the two folding rollers 14 are identical in structure and matched with each other, a folding notch 15 is configured in one side of each folding roller 14, a blade 16 is arranged on the other side of the corresponding folding roller 14, a rotating arm 18 is rotatably arranged on each folding roller 14 through a revolving shaft 17 and equipped with a limiting pillar 19, barrier pillars 20 matched with the limiting pillars 19 to each other are arranged on the folding device frame 5, a folding hook 21 is connected to one end of each rotating arm 18, a hook part of each folding hook 21 is arranged in the corresponding folding notch 15, and the other end of the corresponding rotating arm 18 is arranged on the corresponding folding roller 14 through a spring 22.

When the processing equipment of the pet urine pad convenient to carry is used, as shown in FIG. 1, a continuous pet urine pad 10 produced by the pet urine pad processing main machine is conveyed to the buffer device 4 through the conveying device 2, is drawn by the transverse traction device 6, is subsequently drawn by the vertical traction device 7, is marked with breaking-point lines 11 after entering the point-breaking device 8 and is folded after entering the folding device 9; and the folded pet urine pads 12 convenient to carry are stacked on the folding device frame 5.

As shown in FIG. 2, the working principle of the folding device 9 lies in that: when the continuous pet urine pad 10 enters a space between two folding rollers 14, the blades 16 push the middle part of the continuous pet urine pad 10 into the folding notches 15, the folding hooks 21 hook the middle part of the continuous pet urine pad 10, the continuous pet urine pad 10 is folded by virtue of rotation of one folding rollers 14, when the limiting pillars 19 on the rotating arms 18 pass through the barrier pillars 20 while the continuous pet urine pad is at position, the folding hooks 21 are tripped off instantly, and then the other folding roller 14 begins to repeat said folding operation by means of resetting of the springs 22, again and again.

Figure 4:
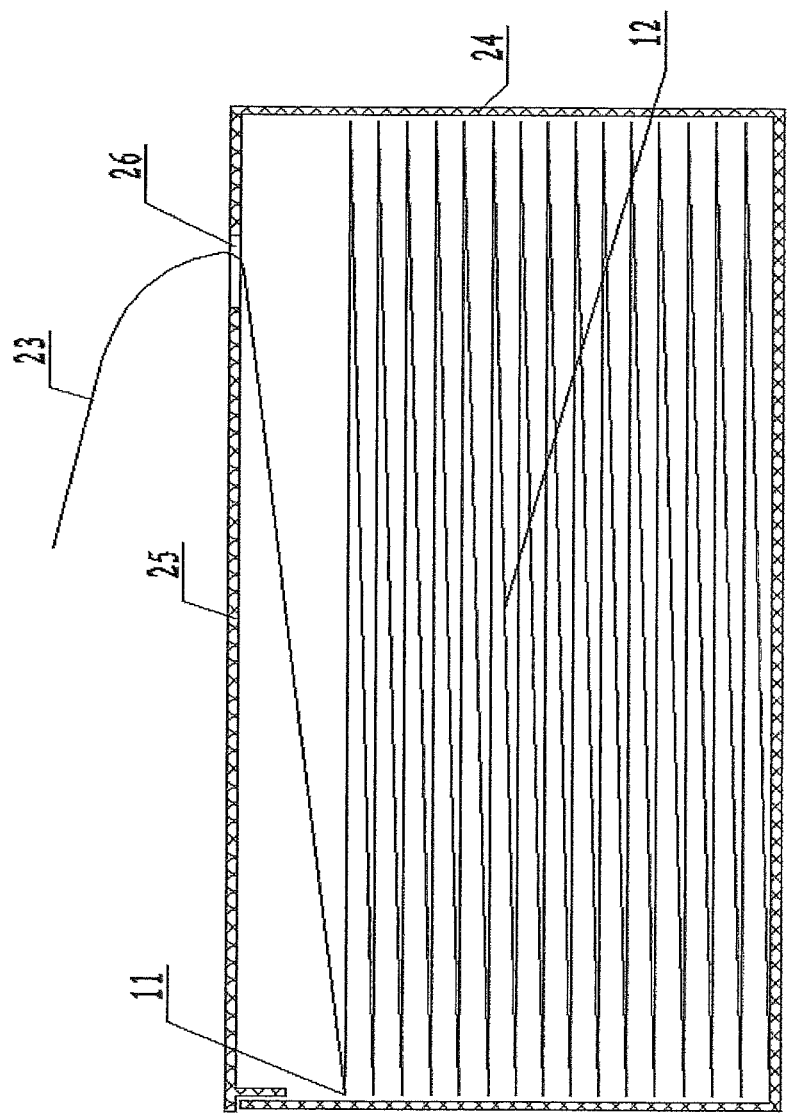
FIG. 4 is a structural schematic diagram when the pet urine pad in the pet urine pad convenient to carry as well as the production method and processing equipment thereof is placed in a urine pad packaging box according to the present invention.

As can be seen from FIG. 4, the pet urine pad 12 convenient to carry is put in a urine pad package box 24, an upper cover 25 is arranged on the upper end of the urine pad package box 24, a pulling opening 26 is formed in the middle of the upper cover 25, and the single urine pad 23 can be drawn from the pulling opening 26 and is tore off from the breaking-point line 11.

The pet urine pad convenient to carry as well as the production method and processing equipment thereof are high in production efficiency; the produced pet urine pad convenient to carry is convenient and efficient to use, occupies a small space and is convenient to draw, transport and store since the multiple folded single urine pads are sequentially laminated and stored to form an integral body from top to bottom, and thus beautifies the household environment, keeps the household environment clean and tidy and alleviates the labor intensity of people.

What is claimed is:

1. A processing equipment of a pet urine pad convenient to carry, comprising:
   a pet urine pad processing main machine frame;
   a conveying device arranged on the pet urine pad processing main machine frame; and a buffer device frame arranged at a rear end of the pet urine pad processing main machine frame, wherein a buffer device is arranged on the buffer device frame, wherein a folding device frame is arranged at a rear end of the buffer device frame, wherein a transverse traction device is arranged on one side of a front end of the folding device frame, wherein a vertical traction device is arranged in a middle of an upper end of the folding device frame, wherein a point-breaking device is arranged on the folding device frame at a lower end of the vertical traction device, wherein a folding device is arranged on the folding device frame at a lower end of the point-breaking device, and wherein a structure of the folding device comprises two folding rollers symmetrically arranged on the folding device frame through rotating shafts, respectively, wherein the two folding rollers are identical in structure and matched with each other, a folding notch is configured in one side of each folding roller, a blade is arranged on the other side of the corresponding folding roller, a rotating arm is rotatably arranged on each folding roller through a revolving shaft and equipped with a limiting pillar, barrier pillars matched with the corresponding limiting pillars to each other are arranged on the folding device frame, a folding hook is connected to one end of each rotating arm, a hook part of each folding hook is arranged in the corresponding folding notch, and the other end of the corresponding rotating arm is arranged on the corresponding folding roller through a spring.

2. A method for producing the pet urine pad convenient to carry using the processing equipment of claim 1, comprising:

producing a continuous pet urine pad the pet urine pad processing main machine;

conveying the continuous pet urine pad to the buffer device using the conveying device, wherein the continuous pet urine pad is drawn by the transverse traction device and subsequently drawn by the vertical traction device in the vertical direction to enter the point-breaking device, marking the continuous pet urine pad with a breaking-point line after it has entered the point-breaking device; and folding the continuous pet ring pad with the breaking-point line after it has entered the folding device, wherein the folded pet urine pads are stacked on the folding device frame, wherein the folding of the continuous pet ring pad further comprises:

entering the continuous pet urine pad in a space between the two folding rollers, pushing a middle part of the continuous pet urine pad with the blades into the folding notches, hooking the middle part of the continuous pet urine pad with the folding hooks, and folding the continuous pet urine pad by virtue of rotation of one of the folding rollers, when the limiting pillars on the rotating arms pass through the barrier pillars while the continuous pet urine pad is at position, such that the folding hooks are tripped off instantly, and then the other folding roller begins to repeat said folding by means of resetting of the springs.

* * * * *